United States Patent [19]

Johnston et al.

[11] Patent Number: 4,692,361
[45] Date of Patent: Sep. 8, 1987

[54] FILM LAMINATE WITH GAS BARRIER FOR STERILE FLEXIBLE CONTAINERS

[75] Inventors: William D. Johnston, Buffalo Grove; Leonard Czuba, Lombard; R. D. Webster, Barrington, all of Ill.; Yasuhiko Hori, Kawasaki, Japan; Masanori Nagata, Tokyo, Japan; Shigeki Imano, Kawasaki, Japan

[73] Assignee: Baxter Travenol Laboratories, Inc., Deerfield, Ill.

[21] Appl. No.: 655,493

[22] Filed: Sep. 28, 1984

[51] Int. Cl.⁴ .................. B65D 85/72; B32B 27/08
[52] U.S. Cl. ...................................................... 428/35
[58] Field of Search .............. 428/423.5, 424.6, 424.8, 428/475.8, 35, 36; 383/113; 604/408

[56] References Cited

U.S. PATENT DOCUMENTS

| | | | |
|---|---|---|---|
| 3,023,126 | 2/1962 | Underwood et al. | 428/35 |
| 3,297,518 | 1/1967 | Maschner et al. | 428/424.8 |
| 3,489,631 | 1/1970 | Chen et al. | 156/244 |
| 3,514,367 | 5/1970 | James | 428/424.6 |
| 3,715,074 | 2/1973 | Michel | 229/57 |
| 3,836,425 | 9/1974 | Whiting | 428/35 |
| 3,908,070 | 9/1975 | Marzolf | 428/475.8 |
| 3,997,383 | 12/1976 | Bieler et al. | 156/244 |
| 4,092,202 | 5/1978 | Bergk et al. | 156/331 |
| 4,095,012 | 6/1978 | Schirmer | 428/424 |
| 4,104,404 | 8/1978 | Bieler et al. | 428/35 |
| 4,140,162 | 2/1979 | Gajewski et al. | 150/1 |
| 4,184,005 | 1/1980 | Bauriedel et al. | 428/420 |
| 4,210,686 | 7/1980 | Gajewski et al. | 428/35 |
| 4,268,531 | 5/1981 | Whiting, Jr. | 426/126 |
| 4,322,003 | 3/1982 | Long | 206/525 |
| 4,326,574 | 4/1982 | Pallaroni et al. | 150/8 |
| 4,352,850 | 10/1982 | Yamamoto | 428/214 |
| 4,370,374 | 1/1983 | Raabe et al. | 428/216 |
| 4,397,916 | 8/1983 | Nagano | 428/461 |
| 4,399,173 | 8/1983 | Anthony | 428/35 |
| 4,407,873 | 10/1983 | Christensen et al. | 428/475.8 |
| 4,410,595 | 10/1983 | Matsumoto et al. | 428/412 |
| 4,440,815 | 4/1984 | Zomorodi et al. | 428/35 |
| 4,482,585 | 11/1984 | Ohodaira et al. | 428/35 |

FOREIGN PATENT DOCUMENTS 0067420 12/1982 European Pat. Off.

*Primary Examiner*—John E. Kittle
*Attorney, Agent, or Firm*—John P. Kirby; Paul C. Flattery; Robert M. Barrett

[57] ABSTRACT

A film laminate for flexible containers capable of containing a product to be maintained and removed under sterile conditions. The film laminate having an outside layer of linear low density polyethylene, a gas barrier layer, a core layer of polyamide, and an inside layer of linear low density polyethylene. The layers being bonded together by a polyurethane adhesive.

34 Claims, 2 Drawing Figures

FILM LAMINATE WITH GAS BARRIER FOR STERILE FLEXIBLE CONTAINERS

BACKGROUND OF THE INVENTION

This invention relates to a film laminate structure for flexible containers. In particular, this invention relates to a multilayer high barrier laminate film structure for flexible containers capable of containing a product to be maintained and removed under sterile conditions.

Flexible containers are utilized in the medical industry for containing, inter alia, parenteral solutions, dialysis solutions, frozen drugs, nutrition products, respiratory therapy products, and plasma. Because these containers are utilized to contain fluids or solids that are introduced into a patient's body, it is necessary for the containers to be; essentially transparent; flexible; essentially free of extractables; and capable of maintaining the product contained therein under sterile conditions until the product is accessed or removed from the flexible container.

It is also important that the film used in constructing these containers is sufficiently strong so that the containers constructed from the film have sufficient strength. Moreover, if the laminate film is to be constructed into a commercially viable flexible container, it is necessary that the flexible film can be run on some type of commercial production machine. One such machine is a form, fill and seal packaging machine. A form, fill and seal packaging machine requires that the film be sealable on at least two sides. The side seals are typically effectuated by sealing the inside layer of the film to itself.

It may also be desirable to attach a fitment on the film structure to create a flexible container with a fitment. The fitment is typically heat sealed to the film. Accordingly, it may also be necessary that the film structure is heat sealable on its outside layer so that the fitment may be sealed thereto.

Because the film laminate is to be utilized for flexible containers that house a medical product that is to be introduced into a patient's body, it is necessary that the film structure does not contain chemicals that will be extracted by the medical product. This is an especially critical consideration when choosing an adhesive for bonding the laminate layers together. If a fitment is utilized and sealed to the outside layer of the film it is possible that there will be fluid communication between the product and the layers of the laminate. Thus, if the adhesive contains possible hazardous components that may be extractable the film may not include a fitment sealed to the outside well.

A further consideration in choosing the proper film for creating a flexible container is the product to be housed. In applications of the film to produce containers for products stored at room temperature, it is necessary that the film provides a container with sufficient barrier properties. Without a sufficient barrier, water vapor, oxygen, and other gases and vapors may permeate the film inactivating or degrading the product contained therein.

Thus, there is a need for a film laminate structure for creating a sterile flexible container that overcomes the disadvantages of the prior art.

SUMMARY OF THE INVENTION

The present invention provides a film laminate for flexible containers capable of containing a product to be maintained and removed under sterile conditions. The film laminate comprises an outside layer of linear low density polyethylene, a gas barrier layer, a core layer of biaxially oriented nylon, an inside layer of linear low density polyethylene, and three layers of a polyurethane adhesive that bonds the outside, inside, gas barrier, and core layers together.

Preferably the inside and outside layers have a thickness of approximately 40 to about 100 microns, the gas barrier layer has a thickness of approximately 20 to about 50 microns, and the core layer has a thickness of approximately 10 to about 40 microns. The polyurethane adhesive layers preferably have a thickness of approximately 1 to about 10 microns. The preferred thickness of the film laminate is approximately 155 to about 230 microns. Preferably the inside and outside layers have a density of approximately 0.91 to 0.94 grams/cubic centimeters.

In a preferred embodiment the film laminate can be formed into, and function as a container for products maintained at room temperature. The preferred material for the gas barrier is polyvinylidene chloride.

The outside and inside layers of the film laminate preferably include an antioxidant, stabilizer, antiblocking agent, and slip agent.

Accordingly, it is an advantage of the present invention to provide a multilayer laminate structure that may be utilized to create a sterile flexible container.

Another advantage of the present invention is to provide a film structure that is sealable on its inside and outside layers.

A still further advantage of the present invention is that it provides a film that can be utilized to produce a container having a fitment heat sealed on the outside wall.

An additional advantage of the present invention is to provide a film laminate structure that includes an adhesive that may be utilized to house medical products.

Moreover, an advantage of the present invention is to provide a film laminate structure that can be utilized to produce a flexible bag that may house parenteral products including intravenous solutions, dialysis solutions, frozen drugs, nutrition products, respiratory therapy products, and plasma.

A further advantage of the present invention is to create a film laminate structure that can be utilized in a form, fill and seal packaging machine to create a flexible container.

A still further advantage of the present invention is to create a film laminate structure that has sufficient strength to create flexible containers for housing medical products.

Another advantage of the present invention is that it provides a film that has a gas and vapor barrier.

A still further advantage of the present invention is that it provides a film that can be utilized to produce flexible containers for housing drugs and products maintained at temperatures aove 0° C.

A further advantage of the present invention is that it provides a four layer laminate film with three adhesive layers that may be utilized to produce a sterile flexible container.

Moreover, an advantage of the present invention is that the film laminate has a thickness of approximately 155 to about 230 microns.

A still further advantage of the present invention is that it provides an outside layer and inside layer constructed from a linear low density polyethylene containing a minor amount of a copolymerizing olefin such as 1-hexene, and including a stabilizer, an antiblock agent, an antioxidant, and a slip agent.

Another advantage of the present invention is that it provides an economical alternative to presently available high barrier films.

Additional features and advantages are described in, and will be apparent from, the Detailed Description of the Presently Preferred Embodiments and from the drawings.

DETAILED DESCRIPTION OF THE PRESENTLY PREFERRED EMBODIMENTS

The film structure of the present invention is utilized to produce flexible containers capable of containing a fluid or solid to be maintained and removed under sterile conditions. These containers typically consist of a liquid containment body defined by thermally sealed walls. The containers are utilized to package, inter alia, parenteral products including intravenous solutions dialysis solutions, frozen drugs, nutrition products, respiratory therapy products, and plasma. The preferred film structure of this invention is a multilayer laminate structure designed to package parenteral products including intravenous solutions, dialysis solutions, nutrition products, respiratory therapy products, and plasma.

Figure 1:
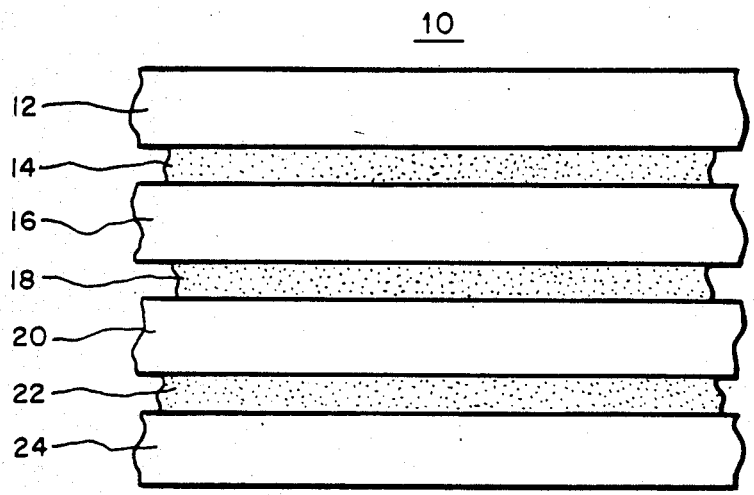
FIG. 1 illustrates a schematic cross-sectional view of an embodiment of the film laminate structure of this invention.
Figure 2:
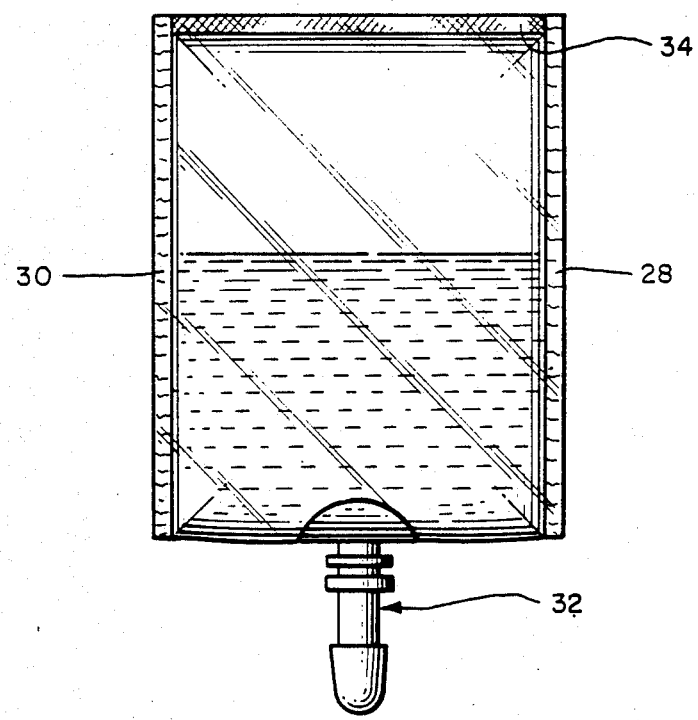
FIG. 2 illustrates a perspective view of a flexible container constructed from the film laminate of this invention.

Referring to FIG. 1, a presently preferred embodiment of the film laminate structure 10 of the present invention is illustrated. The film laminate structure 10 includes an outside layer 12, a first adhesive layer 14, a gas barrier 16, a second adhesive layer 18, a core layer 20, a third adhesive layer 22, and an inside layer 24. As will be described in more detail below, the adhesive layers 14, 18 and 22 bond the outside and gas barrier layers 12 and 16, the gas barrier and core layers 16 and 20, and the core layer and inside layers 20 and 24 respectively. As also discussed in more detail below, as illustrated in FIG. 2, the film laminate structure 10 may be utilized to create a flexible container 26.

The outside and inside layers 12 and 24 are constructed from a polyethylene polymer. Preferably, the outside and inside layers 12 and 24 are a linear low density polyethylene. As used herein, linear low density means that the polyethylene is made by low pressure polymerization and has a density between approximately 0.91 to about 0.94 grams/cubic centimeter. The preferred density of the linear polyethylene is between approximately 0.915 to about 0.93.

The preferred linear low density polyethylene contains approximately 2% to about 10% by weight 1-hexene. In a most preferred embodiment, the polyethylene copolymer contains approximately 5% by weight 1-hexene. Other olefinic comonomers with 4 to 18 carbon atoms also function satisfactorily. Examples of these olefins are 1-octene, 1-butene, 1-pentene, and 4-methyl-1-pentene which may be present as approximately 5% to about 11% by weight of the linear low density polyethylene.

Because the film laminate 10 is to be utilized to produce flexible containers 26 through a commercial packaging machine, it is important that the outside layer 12 has a sufficiently low coefficient of friction. The outside layer 12 must have a low coefficient of friction to ensure that it flows smoothly through the processing machine, e.g., a form, fill and seal packaging machine. Preferably the outside layer 12 has a coefficient of friction of approximately 0.2 to about 0.4 as measured by ASTM test D-1894 between the outside layer and a stainless steel surface. The preferred coefficient of friction of the outside layer 12 is approximately 0.25.

To provide the linear low density polyethylene with a sufficiently low coefficient of friction the polyethylene copolymer is slip modified by adding a fatty acid amide additive that acts like a lubricant and lowers the coefficient of friction of the film 10. The preferred fatty acid amides have 8 to 22 carbon atoms. Oleic amide has been found to modify the linear low density polyethylene sufficiently to produce the required coefficient of friction. Preferably approximaley 0.03% to about 0.15% by weight of oleic amide is added to the linear low density polyethylene.

An important consideration for the outside layer 12 and inside layer 24 is their thickness. In order to create a flexible container 26 the inside layer 24 must be sealed to itself on at least two walls 28 and 30. Moreover, if a fitment 32 is to be attached to the flexible container 26 it may be desirable that the fitment 32 is heat sealed to the outside layer 12. Preferably, the outside layer 12 and inside layer 24 have a thickness of between approximately 40 to about 100 microns. The preferred thickness of the outside and inside layers 12 and 24 is between approximately 50 and about 70 microns. This thickness affords: a good heat seal; good clarity; pinhole resistance; a good tensile strength; sufficient impact strength; and provides good flexibility for the film laminate 10.

It is not necessary that the outside layer 12 and inside layer 24 have the same thickness. However, if the outside layer 12 and inside layer 24 have the same thickness, and the layers have approximately the same coefficient of friction, this provides a film structure that resists curl and is a more versatile film laminate 10 in that it may be fed into the packaging machine with either side facing in either direction.

The linear low density polyethylene layers 12 and 24 provide properties to the film laminate structure 10 that allows the laminate to be utilized to produce a frozen drug bag. The low temperature properties, as well as the excellent heat sealability of linear low density polyethylene makes it suitable for use in producing a frozen drug bag. These properties are important in view of the fact that the temperature of the frozen drug bag when it is shipped is $-25°$ C. For typical prior art flexible containers, e.g., those made from polyvinyl chloride, at this temperature the containers fall below the glass transition state, and therefore the materials of which the containers are made are very brittle. Therefore, flexible bags made from polyvinyl chloride may easily break. In contrast, linear low density polyethylene's glass transition state is below $-80°$ C. and accordingly, when used as a frozen drug bag it will not fall below its glass transition state.

Preferably, the outside layer and inside layer 12 and 24 contain an antioxidant. The antioxidant functions to provide needed properties when the resin pellets are produced. Four antioxidants have been found to provide satisfactory results: tetrakis[methylene-3-(3',5'-di-tert-butyl-4'-hydroxy phenyl)propionate]methane (manufactured by Ciba-Geigy under the name Irganox 1010); n-octadecyl-beta-(4'-hydroxy-3',5'-di-tert-butyl phenyl)propionate (manufactured by Ciba-Geigy under the name Irganox 1076); butylated hydroxytoluene; 1,3,5-trimethyl-2,4,6-tris[3,5-di-tert-butyl-4-hydroxybenzyl]benzene ("Ethyl" antioxidant 330 manufactured by Ethyl Corporation); and tetrakis(2,4-di-tert-butylphenyl)-4-4'-biphenylene diphosphate (manufactured by Sandoz under the name Sandostab P-EPQ). The preferred antioxidants are Irganox 1010 and P-EPQ. Preferably approximately 0.03% to about 0.15% by weight of the antioxidant are added to the linear low density polyethylene copolymer.

The linear low density polyethylene preferably also contains a stabilizer and an antiblocking agent. The stabilizer provides needed properties during the production of the film from the resin pellets. Preferably the stabilizer is calcium stearate and comprises approximately 0.02% to about 0.06% by weight of the polyethylene. The antiblocking agent prevents the film from sticking together. Preferably the antiblocking agent is magnesium silicate and comprises approximately 0.11% to about 0.15% by weight. Other antiblocking agents that have been found to produce satisfactory results are aluminum hydroxide and magnesium hydroxide.

The gas barrier layer 16 of the film laminate 10 functions to provide a high barrier laminate. Because of the gas barrier layer 16 the film laminate 10 is highly impermeable to water, oxygen, and other fluids. This allows the film laminate 10 to be utilized to create flexible containers 30 that can house drugs and other products that are maintained or stored at temperatures above 0° C. Specifically, the film laminate 10 can be utilized to create flexible containers 26 for housing medical products stored at room temperature.

The preferred material for the gas barrier is polyvinylidene chloride (PVDC) manufactured by Dow Chemical and sold under the trademark SARAN. Dow Chemical's PVDC film X01621.10 has been found to produce satisfactory results as has a PVDC film manufactured by Asahi Kasei Kogyo Co., of Japan. The gas barrier may also be constructed from a hydrolized ethylene vinyl acetate.

Preferably the gas barrier has a thickness of approximately 18 to about 60 microns. Most preferably, the gas barrier has a thickness of approximately 25 to 50 microns.

The core layer 20 of the present invention is a polyamide, preferably nylon. The preferred nylon for the core layer 20 is a biaxially oriented nylon. A biaxially oriented nylon 6, such as the one manufactured by Unitika Ltd. of Osaka, Japan has been found to produce satisfactory results. Other nylons may also be utilized. Examples of such nylons are nylon 6-6, nylon 11, and nylon 12. All of these nylons may be either oriented or cast films.

As used herein, biaxially oriented nylon means that the nylon film has been extruded and stretched in both directions. This ensures that the molecules of nylon are biaxially oriented. This provides the film laminate structure 10 with increased mechanical qualities, i.e. pinhole resistance; tear resistance (resistance to the start of a tear); and stretch resistance.

Preferably, the core layer 20 has a thickness of between approximately 10 to about 40 microns. The preferred thickness of the core layer 20 is approximately 15 to about 20 microns. Preferably, the biaxially oriented nylon includes a slip agent. The preferred slip agent is silicon dioxide.

The first adhesive layer 14 bonds the outside layer 12 to the gas barrier layer 16, the second adhesive layer 18 bonds the gas barrier layer 16 to the core layer 20; and the third adhesive layer 22 bonds the inside layer 26 and core layer 20 to each other. Preferably the adhesive is an aliphatic polyurethane. The preferred aliphatic polyurethane is a polyester-urethanediol resin manufactured by Takeda Chemical Industries Co., Ltd. under the name Takelac A-385 or Takelac A-520. The preferred aliphatic polyurethane sealer layers 14, 18 and 22 also include a hardener, Takenate A-50 manufactured by Takeda Chemical Industries Co., Ltd., comprising 3-isocyanatomethyl-3,5,5-trimethyl cyclohexyl isocyanate adduct trimethylol propane or 1,3-bis-(isocyanatomethyl)benzene adduct of trimethylol propane, and a solvent ethyl acetate.

The adhesive layers 14, 18 and 22 create a strong bond between the polyethylene layers 12 and 24, the gas barrier layer 16, and the core layer 20. Preferably the peel strength of the bond is at least 500 gms/inch of force to delaminate. The aliphatic polyurethane adhesive layers 14, 18 and 22 also provide the following desirable properties to the laminate film structure 10: transparency; flexibility; low temperature resistance; processability; initial tackiness; and pinhole resistance.

The preferred thickness of each of the adhesive layers 14 and 16 is approximately 1 to about 10 microns. The most preferred thickness of each of the adhesive layers 14, 18 and 22 is approximately 3 to about 5 microns.

It has been found that the adhesive layers 14, 18 and 22 may be utilized even if a fitment 32 is attached to the outside layer 12. If the fitment 32 is attached to the outside layer 12, the product within the container 26 will be in fluid communication with the adhesive layers 14, 18 and 22.

The total thickness of the film laminate 10 is preferably approximately 155 to about 230 microns. This provides a film laminate that: is flexible; has good strength; has good heat seals; good clarity; and sufficient impact strength.

The film laminate 10 of this invention is preferably produced by dry lamination. Preferably, a dry lamination process utilizing a two-component curing system is utilized. The adhesive is tacky at the time of combination, and curing occurs at a controlled temperature.

Referring now to FIG. 2, the flexible container 26 constructed from the film laminate 10 of this invention is illustrated. As illustrated, the inside layer 24 is heat sealed together on itself to create walls 28, 30 and 34. Due to the construction of the inside layer 24, a strong heat seal is created.

Also, as illustrated, a fitment 32 may be sealed to the outside layer 12 of the container 26. Preferably, the fitment 32 is heat sealed to the outside layer 12. Due to the construction of the outside layer 12, a strong heat seal is created.

Thus, the present invention creates a film laminate structure 10 that can run through a form, fill and seal packaging machine to create flexible containers 26 including a fitment 32 that can house a medical product to be maintained and extracted under sterile conditions.

By way of example, and not limitation, examples of the film laminate 10 will now be set-forth:

EXAMPLE 1

Step 1

Laminate a 25 micron film of Dow PVDC film X01621.10 to a 15 micron film of oriented nylon 6 polymer (the nylon 6 includes a silicon dioxide as a slip agent) using 3-4 microns of an aliphatic urethane adhesive by way of a dry-bonding process.

Step 2

Laminate a 60 micron blown film of linear low density polyethylene (the polyethylene has 5% by weight 1-hexene as its copolymer component and the following additives: antioxidants-Irganox 1010 and P-EPQ, stabilizer-calcium stearate, antiblock-magnesium silicate and slip agent-oleic amide) to the laminate made in Step 1 using 3-4 microns of an aliphatic urethane adhesive by way of a dry-bonding process.

Step 3

Take the three layer laminate made in Step 2 and using the same dry bonding lamination process, laminate another 60 micron layer of the same polyethylene mentioned above to the other side of the laminate film. In each step, the adhesive is applied to the laminate film and "dried" before combining with the polyethylene.

Step 4

The four layer laminate is then cured in a controlled temperature environment such as an oven to completely cure the adhesive layers and allow full bonding of the layers.

EXAMPLE 2

Step 1

Laminate a 50 micron film of Dow PVDC film X01621.10 to a 15 micron film of oriented nylon 6 polymer (the nylon 6 includes a silicon dioxide as a slip agent) using 3-4 microns of an aliphatic urethane adhesive by way of a dry-bonding process.

Step 2

Laminate a 60 micron blown film of linear low density polyethylene (the polyethylene has 5% by weight 1-hexene as its copolymer component and the following additives: antioxidants-Irganox 1010 and P-EPQ, stabilizer-calcium stearate, antiblock-magnesium silicate and slip agent-oleic amide) to the laminate made in Step 1 using 3-4 microns of an aliphatic urethane adhesive by way of a dry-bonding process.

Step 3

Take the three layer laminate made in Step 2 and using the same dry bonding lamination process, laminate another 60 micron layer of the same polyethylene mentioned above to the other side of the laminate film. In each step, the adhesive is applied to the laminate film and "dried" before combining with the polyethylene.

Step 4

The four layer laminate is then cured in a controlled temperature environment such as an oven to completely cure the adhesive layers and allow full bonding of the layers.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A laminate film structure having sufficient flexibility, strength, heat sealability, and slip properties for producing on a packaging machine flexible containers having fitments attached thereto and capable of containing a liquid to be maintained under sterile conditions comprising:
    an inner layer constructed from polyethylene, the inner layer having a thickness of approximately 40 to 100 microns;
    a gas barrier layer having a thickness of approximately 25 to 50 microns;
    a core layer constructed from biaxially oriented polyamide, the core layer having a thickness of approximately 10 to 40 microns;
    an outer layer constructed from polyethylene and having a thickness of approximately 40 to 100 microns, the outer layer including a slip agent and having a coefficient of friction of approximately 0.2 to about 0.4; and
    three layers of an aliphatic polyurethane bonding the layers together.

2. The film structure of claim 1 wherein the polyethylene is a linear low density polyethylene.

3. The film structure of claim 2 wherein the polyethylene copolymer contains approximately 2% to 10% by weight 1-hexene.

4. The film structure of claim 1 wherein the gas barrier is a polyvinylidene chloride.

5. The film structure of claim 2 wherein the density of the linear low density polyethylene copolymer layers is approximately 0.91 to about 0.94 grams/cubic centimeters.

6. The film structure of claim 2 wherein the linear low density polyethylene layers include the following additives:
    an antioxidant;
    a stabilizer;
    a slip agent; and
    an antiblocking agent.

7. The film structure of claim 1 wherein the aliphatic polyurethane adhesive has a thickness of between approximately 1 to about 10 microns.

8. The film structure of claim 7 wherein the bond strength of the polyethylene layers to the gas barrier layer and core layer is at least 500 gms/inch of force to delaminate.

9. The film structure of claim 1 wherein the thickness of the film structure is approximately 155 to about 230 microns.

10. A film structure having sufficient flexibility, strength, heat sealability, and slip properties for producing on a packaging machine a flexible container for containing a liquid to be administered into a patient's body comprising:
    a layer of a linear low density polyethylene copolymer for forming an outside layer of the flexible container;
    a layer of polyvinylidene chloride for forming a gas barrier layer;
    a layer of biaxially oriented nylon for forming a core layer of the flexible container;

a layer of a linear low density polyethylene copolymer for forming an inside layer of the flexible container; and the layers being bonded by a polyurethane adhesive.

11. The film structure of claim 10 wherein the polyethylene layers that comprise the outside and inside layers of the flexible container have a density of between approximately 0.91 to about 0.94 grams/cubic centimeters.

12. The film structure of claim 10 wherein the outside layer includes approximately 0.05% to about 0.15% by weight of a fatty acid amide containing 8 to 22 carbon atoms.

13. The film structure of claim 12 wherein the fatty acid amide is an oleic amide.

14. The film structure of claim 10 wherein the outside layer has a coefficient of friction of between 0.2 to 0.4.

15. The film structure of claim 10 wherein the polyurethane adhesive comprises a polyester-urethanediol resin.

16. The film structure of claim 15 wherein the layers are bonded to each other at a peel strength of at least 500 gms/inch of force to delaminate.

17. The film structure of claim 10 wherein the linear low density polyethylene copolymers that comprise the outside and inside layers of the flexible container include:
an antioxidant;
a slip agent;
a stabilizer; and
an antiblocking agent.

18. The film structure of claim 17 wherein:
the antioxidant is selected from the group consisting of tetrakis[methylene-3-(3'5'-di-tert-butyl-4'-hydroxy phenyl)propionate]methane, n-octadecyl-beta-(4'-hydroxy-3',5'-di-tert-butylphenyl)propionate, butylated hydroxytoluene, Ethyl antioxidant 330, and tetrakis(2,4-di-tert-butylphenyl)-4,4'-biphenylene disphosphonite;
the stabilizer is calcium stearate; and
the anti-blocking agent is selected from the group consisting of magnesium hydroxide, aluminum hydroxide, and magnesium silicate.

19. The film structure of claim 10 wherein:
the outside layer has a thickness of approximately 40 to about 100 microns;
the inside layer has a thickness of approximatly 40 to about 100 microns;
the gas barrier layer has a thickness of approximately 25 to about 50 microns; and
the core layer has a thickness of approximately 10 to about 40 microns.

20. The film structure of claim 19 wherein the thickness of the film structure is approximately 155 to about 230 microns.

21. The film structure of claim 10 wherein the polyvinylidene chloride is SARAN.

22. A flexible container capable of containing under sterile conditions a fluid or solid to be stored at temperatures above 0° C. having a body portion with opposed, peripherally sealed walls forming the container the walls being constructed from a laminate comprising:
an outside layer constructed from linear low density polyethylene;
a gas barrier layer constructed from polyvinylidene chloride;
a core layer constructed from biaxially oriented nylon;
an inside layer constructed from linear low density polyethylene; and
three layers of a urethane adhesive for bonding the outside, vapor barrier, core, and inside layers.

23. The flexible container of claim 22 wherein the outside layer and inside layer have a density of approximately 0.91 to about 0.94 grams/cubic centimeters.

24. The flexible container of claim 22 wherein the film laminate has a thickness of approximately 150 to about 200 microns.

25. The flexible container of claim 22 wherein the outside layer contains a slip agent.

26. The flexible container of claim 22 wherein the outside layer has a coefficient of friction of approximately 0.2 to about 0.4.

27. The flexible container of claim 22 wherein:
the outside layer has a thickness of approximately 40 to about 100 microns;
the inside layer has a thickness of approximately 40 to about 100 microns;
the gas barrier has a thickness of approximately 25 to about 50 microns; and
the core layer has a thickness of approximately 10 to 40 microns.

28. The flexible container of claim 27 wherein the outside and inside layer have approximately the same thickness.

29. The flexible container of claim 27 wherein each of the layers of urethane adhesive have a thickness of approximately 1 to about 10 microns.

30. The flexible container of claim 28 wherein the layers are bonded to each other at a peel strength of at least 500 gms/inch of force to delaminate.

31. The flexible container of claim 22 including a fitment heat sealed to the outside layer.

32. The flexible container of claim 22 wherein a portion of the inside layer is heat sealed together to create the walls of the flexible container.

33. The flexible container of claim 1 wherein the biaxially oriented nylon includes a slip agent.

34. The flexible container of claim 22 wherein the gas barrier layer is constructed from SARAN.

* * * * *

UNITED STATES PATENT AND TRADEMARK OFFICE
CERTIFICATE OF CORRECTION

PATENT NO. : 4,692,361

DATED : September 8, 1987

INVENTOR(S) : William D. Johnston, et al.

It is certified that error appears in the above-identified patent and that said Letters Patent are hereby corrected as shown below:

Front page, first column:

Assignees: Fujimori Kogyo Co., Inc., Tokyo, Japan, and Baxter Travenol Laboratories, Inc., Deerfield, Illinois On the front page, add to the list of U.S. patent documents Under References Cited, the following entry:

3,912,843    10/1975    Brazier    428/474

Signed and Sealed this

Fifth Day of April, 1988

*Attest:*

DONALD J. QUIGG

*Attesting Officer*    *Commissioner of Patents and Trademarks*